(12) United States Patent
Frank

(10) Patent No.: US 8,545,134 B2
(45) Date of Patent: Oct. 1, 2013

(54) TOOL COMPRISING A FASTENING UNIT

(75) Inventor: Peter Frank, Floh-Seligenthal (DE)

(73) Assignee: Sandvik Intellectual Property AB, Sandviken (SE)

( * ) Notice: Subject to any disclaimer, the term of this patent is extended or adjusted under 35 U.S.C. 154(b) by 280 days.

(21) Appl. No.: 13/054,330

(22) PCT Filed: Jul. 7, 2009

(86) PCT No.: PCT/EP2009/058623
§ 371 (c)(1),
(2), (4) Date: Apr. 8, 2011

(87) PCT Pub. No.: WO2010/006966
PCT Pub. Date: Jan. 21, 2010

(65) Prior Publication Data
US 2011/0182677 A1    Jul. 28, 2011

(30) Foreign Application Priority Data
Jul. 18, 2008   (DE) .......................... 10 2008 040 563

(51) Int. Cl.
*B23C 5/20*    (2006.01)
(52) U.S. Cl.
USPC .................................. 407/37; 407/46; 407/40
(58) Field of Classification Search
CPC .............. B23C 5/24; B23C 5/22; B23C 5/20; B23B 29/03; B23B 29/00
USPC ...... 407/36, 37, 38, 39, 46, 33, 40; 408/186, 408/190, 191, 197, 153, 179, 231, 233, 713
See application file for complete search history.

(56) References Cited

U.S. PATENT DOCUMENTS

| | | | |
|---|---|---|---|
| 1,461,548 A | * | 7/1923 | West .............................. 279/87 |
| 3,162,064 A | | 12/1964 | Musy |

(Continued)

FOREIGN PATENT DOCUMENTS

| | | |
|---|---|---|
| CH | 692 449 A5 | 6/2002 |
| DE | 14 02 926 A | 11/1968 |

(Continued)

OTHER PUBLICATIONS

English translation of the International Preliminary Report on Patentability and Written Opinion dated Feb. 10, 2011, from corresponding International application No. PCT/EP2009/058623, filed Jul. 7, 2009, 6 pages.

(Continued)

*Primary Examiner* — Daniel Howell
*Assistant Examiner* — Ryan Rufo
(74) *Attorney, Agent, or Firm* — Morgan, Lewis & Bockius LLP

(57) ABSTRACT

A milling or boring tool has a main tool body rotatable about a tool axis and a cutting element which can be fastened to the main tool body and which has a cutting portion or a cutting insert seat for receiving a cutting insert. To provide a fastening system for fastening the cutting element to the main tool body, which is to be easily implemented at low cost, which allows highly accurate positioning of the cutting element on the main tool body, and which permits very rapid exchange of the cutting element, a centering pin is arranged parallel to the boring axis with an axis that does not coincide with the tool axis and is connected on one part, the main tool body or the cutting element, and a corresponding centering opening is provided on the other part, the cutting element or the main tool body.

13 Claims, 8 Drawing Sheets

(56) References Cited

U.S. PATENT DOCUMENTS

| | | | |
|---|---|---|---|
| 4,464,088 A * | 8/1984 | Dehn | 408/182 |
| 4,511,294 A * | 4/1985 | Grunsky et al. | 408/232 |
| 4,879,930 A | 11/1989 | Von Haas | |
| 2007/0067979 A1 * | 3/2007 | Zumsteg et al. | 29/558 |

FOREIGN PATENT DOCUMENTS

| | | | |
|---|---|---|---|
| DE | 73 30 973 U | | 12/1973 |
| DE | 32 04 922 A1 | | 8/1983 |
| EP | 0 296 373 A1 | | 12/1988 |
| GB | 2092034 A | * | 8/1982 |
| JP | 2001-347413 | * | 12/2001 |

OTHER PUBLICATIONS

Search Report of German Application 10 2008 040 563.9, dated Feb. 2, 2009.

* cited by examiner

TOOL COMPRISING A FASTENING UNIT

RELATED APPLICATION DATA

This application is a §371 National Stage Application of PCT International Application No. PCT/EP2009/058623 filed Jul. 7, 2009, and claims priority under 35 U.S.C. §119 and/or §365 to German Application No. 10 2008 040563.9, filed Jul. 18, 2008.

The present invention concerns a milling or boring tool having a main tool body rotatable about a tool axis and at least one cutting element which can be fastened to the main tool body and which has a cutting portion or a cutting insert seat for receiving a cutting insert.

In that respect the cutting element may be of a multi-part configuration, for example comprising an extension arm and a cutting insert holder fastened thereto.

In the known tools the cutting element is only fastened to the main tool body by means of screws. That however involves a relatively high level of positional inaccuracy as the exact position of the cutting element on the main tool body depends on the play or the production tolerance of the screws used.

In principle positioning accuracy can be improved by using screws of small diameter. The consequence of that however is that the forces to be carried for many situations of use can no longer be carried by only two or three screws. As the cutting element comes into engagement with the workpiece to be machined, considerable forces can occur at the cutting element in dependence on the feed speed and the nature of the material to be machined, and those forces have to be carried by way of the fastening to the main tool body.

It is therefore necessary in addition to use screws of larger diameter or to use a multiplicity of screws to fasten the cutting element to the main tool body. A multiplicity of screws however results in a marked increase in the length of the equipment and conversion times.

Having regard to the background of the described state of the art therefore the object of the invention is to provide a fastening system for fastening the at least one cutting element to the main tool body, which is to be easily implemented at low cost, which allows highly accurate positioning of the cutting element on the main tool body and which in addition permits very fast exchange of the cutting element.

According to the invention that object is attained in that a centering pin which is arranged parallel to the boring axis and the axis of which does not coincide with the tool axis is connected on one part, the main tool body or the cutting element, and a corresponding centering opening is provided on the other part, the cutting element or the main tool body. In other words either the main tool body could have a centering pin and the cutting element could have a corresponding centering opening or the centering pin could be arranged on the cutting element while the main tool body has the centering opening.

Then, to position the cutting element with respect to the main tool body, the centering pin only has to be fitted into the corresponding centering opening. Both the centering pin and also the centering opening can be manufactured to a high degree of precision so that when the pin is fitted into the opening positioning of the cutting element and the main tool body relative to each other is highly accurate. In that respect the centering pin is advantageously spaced from the tool axis so that the cutting element does not have to extend to the boring axis and possibly a plurality of cutting elements can be arranged on the main tool body.

It has been found that the centering pin is best arranged on the cutting element.

In principle the provision of the centering pin and the centering opening allows relative rotation of the cutting element with respect to the main tool body about the pin. To prevent that the cutting element can additionally be screwed fast to the main tool body.

In a particularly preferred embodiment the centering pin is in the form of a separate part so that it is releasable from the one part. For example therefore both the main tool body and also the cutting element may have a respective centering opening into which the centering pin is then fitted. That embodiment has the advantage that manufacture of the part having the centering pin is less expensive. More specifically if the centering pin is integrally connected to the main tool body or the cutting element, a relatively large amount of material has to be removed on the main tool body or from the cutting element for manufacturing purposes. That increases the material costs and the manufacturing time.

In a further preferred embodiment the centering pin is in the form of a centering sleeve and is preferably of a diameter d of more than 2 cm, particularly preferably more than 5 cm. The diameter d is advantageously larger than 10% of the boring or milling diameter.

Making the centering pin in the form of a centering sleeve reduces the weight of the tool. The provision of a centering pin or centering sleeve of large diameter increases the forces which can be carried by the pin or sleeve.

Even if in principle, as has already been stated in the opening part of this specification, the provision of an additional fastening screw to prevent rotation of the cutting element about the centering pin is possible, a preferred embodiment provides that in addition there is provided a slot nut on the main tool body or the cutting element and there is provided a corresponding slot on the other element, wherein the slot nut at least partially engages into the slot. In other words the main tool body could have a slot nut which engages into a slot provided in the cutting element or the cutting element could have a slot nut engaging into a corresponding slot provided in the main tool body. It will be appreciated that it would also be possible to provide a plurality of slot nuts.

In that respect it can additionally be provided that the slot nut is releasable from the element to which it is fastened. Thus in a preferred embodiment for example both the main tool body and also the cutting element may have a slot, wherein the slot nut is fastened in one of the two slots and upon fastening of the cutting element to the main tool body engages into the other slot.

The term slot nut is used to denote any element having a contact surface which is such that it can bear in the corresponding slot against at least one slot wall.

That measure further improves the positional accuracy of the cutting element on the main tool body.

For example the slot nut may have two fastening bores, wherein the first fastening bore for fastening the slot nut is provided on the one element and the second fastening bore for fastening the other element is provided on the slot nut or the one element. In addition it can be advantageous if the first slot is on a secant through the centering opening, wherein the secant preferably extends through the center point of the centering opening. That ensures optimum force transmission by way of centering pin and slot nut.

In a preferred embodiment it is further provided that the centering pin is arranged further away from the tool axis than the slot nut. In other words the slot nut is preferably disposed on the line connecting the tool axis to the center point of the centering opening.

Further advantages, features and possible uses of the present invention will be apparent from the description hereinafter of the preferred embodiment and the related Figures in which.

Figure 1:
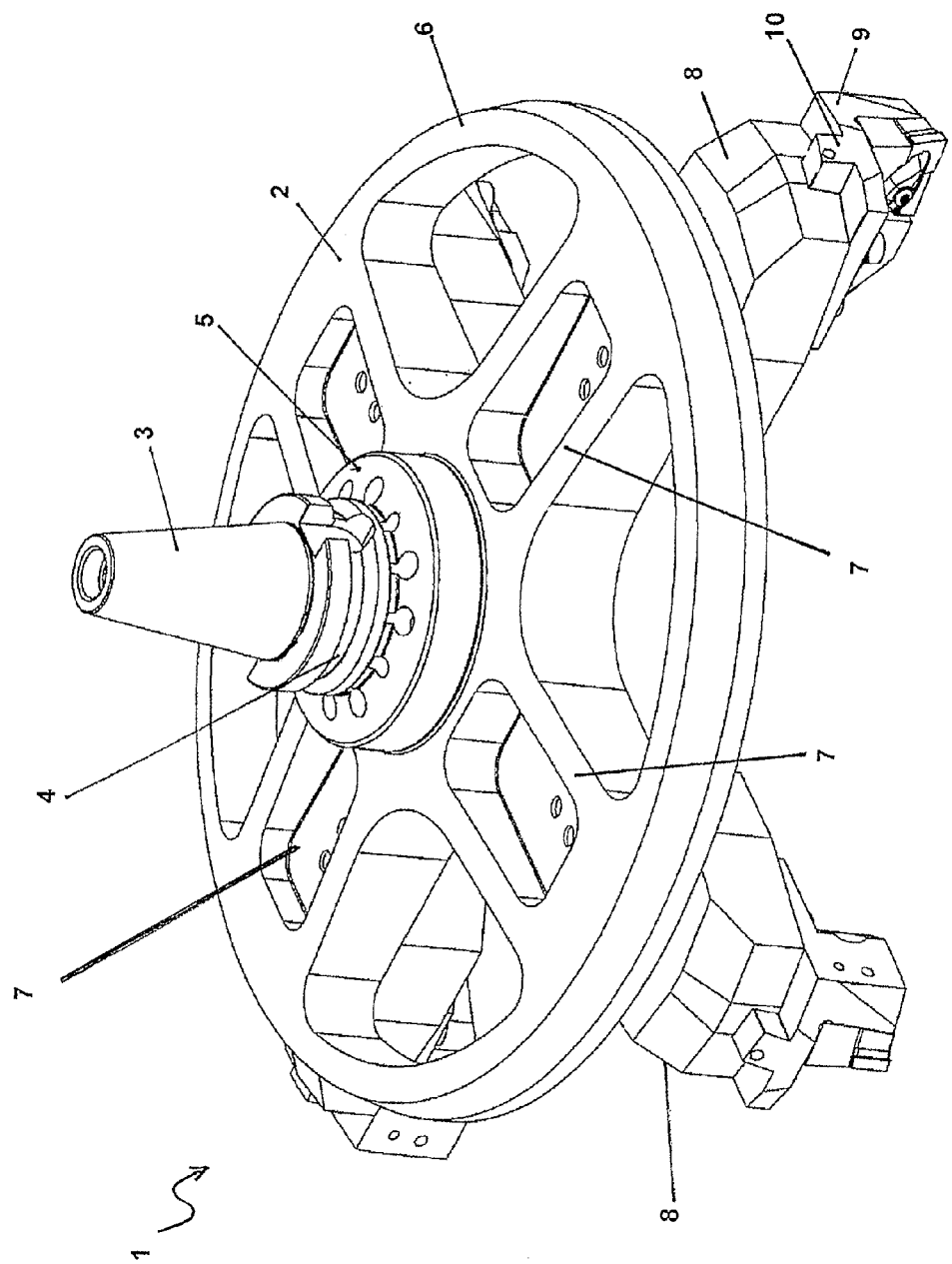
FIG. 1 shows a perspective view of an embodiment of the invention.

FIG. 1 shows a perspective view of an embodiment of the invention. A boring-out tool 1 has a main tool body 2 which has an interface 3 in relation to a corresponding drive. Here the interface 3 comprises a steeply tapering shaft 3, at whose end that is towards the main tool body 2 are provided a gripping groove 4 and a flange 5 for axial support. The interface can also be in the form of a separate component which can be connected to the main tool body 2. Here the main tool body has a wheel-shaped portion 6 connected to an inwardly disposed hub portion by way of corresponding spoke portions 7. Extension arms 8 are mounted to the main tool body 2 or to the spoke portions 7 thereof. The illustrated embodiment has four spoke portions 7, to each of which is mounted a respective extension arm. Carried on the extension arm 8 is a cutting insert holder 9 having a leg-like projection 10 which is disposed in a groove 11 in the extension arm.

Figure 2:
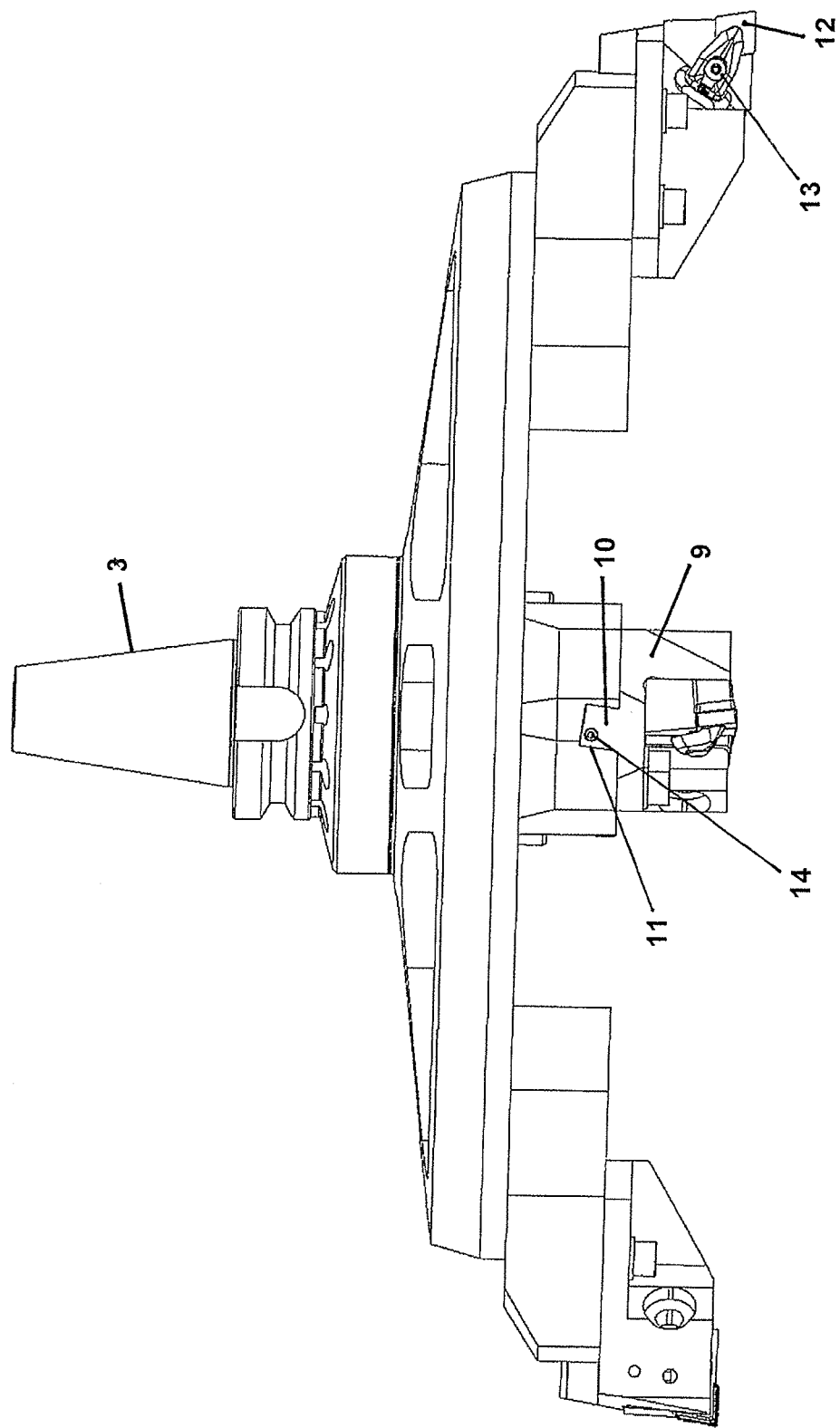
FIG. 2 shows a side view of the embodiment of FIG. 1.

FIG. 2 shows a side view of the FIG. 1 embodiment. It will be seen here that the cutting insert holder 9 has a seat for a cutting insert 12 which is held on the cutting insert holder by means of a clamp 13. It can be best seen in respect of the extension arm 8 shown in the center in FIG. 2 that the leg-like projection 10 is slightly inclined, which in operation leads to a better axial contact pressure. The screw 14 arranged within the leg-like projection 10 serves for radial displacement of the cutting insert holder 9 within the slot 11 in the extension arm 8.

Figure 3:
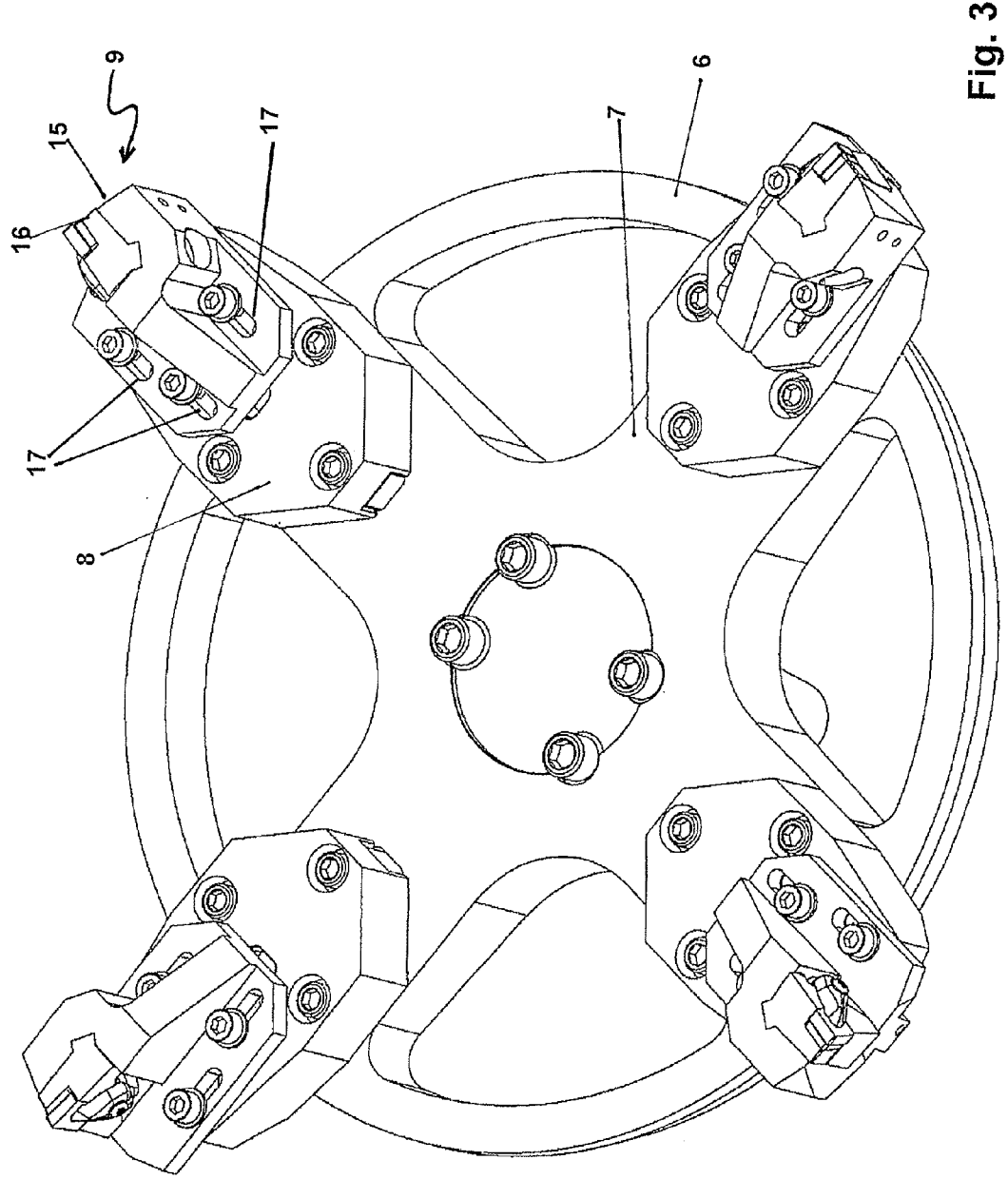
FIG. 3 shows a further perspective view of the embodiment of FIG. 1.
Figure 4:
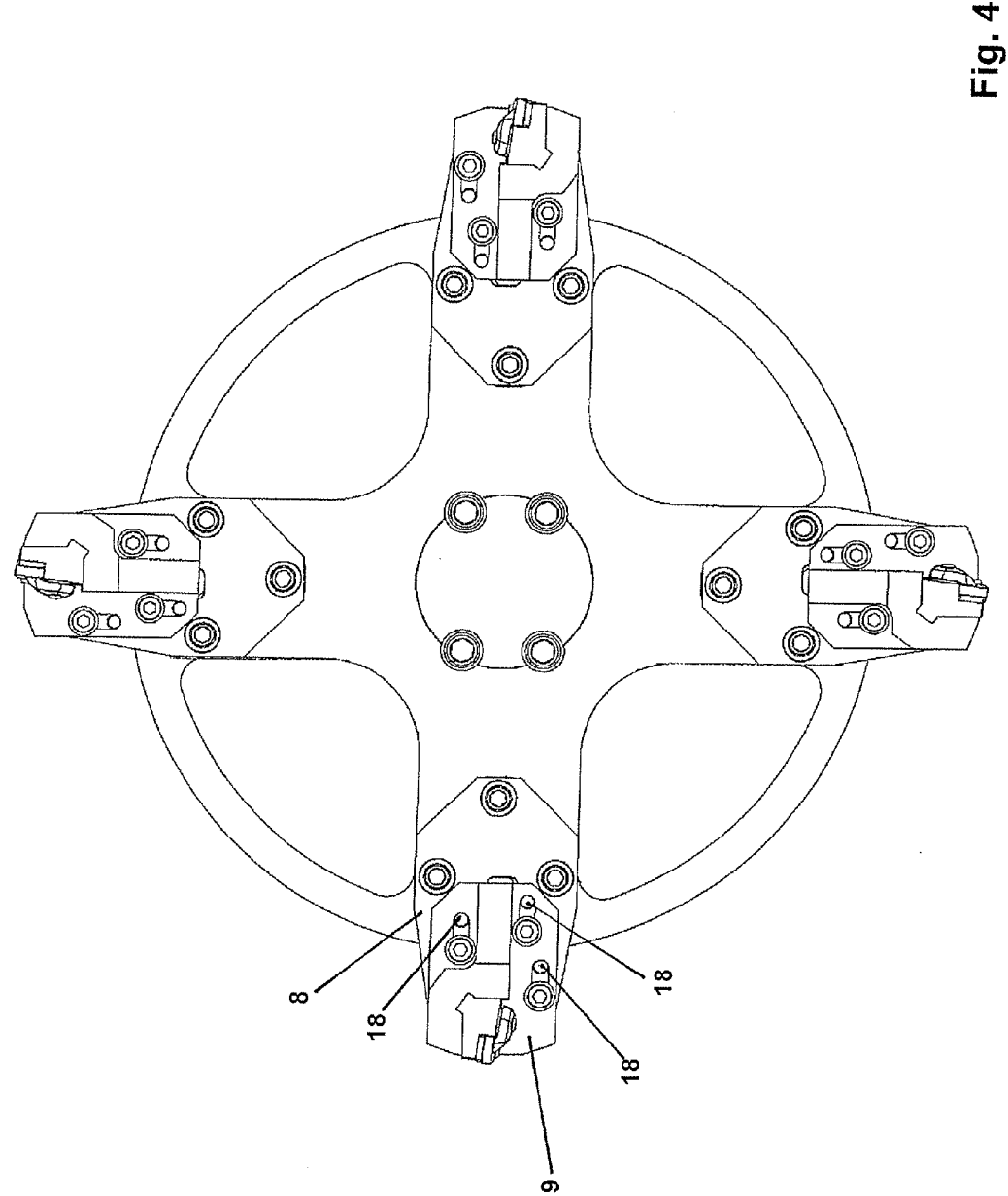
FIG. 4 shows a view from below of the embodiment of FIG. 1.

FIG. 3 shows a perspective view from below and FIG. 4 shows a view from below on to the embodiment of FIGS. 1 and 2. It can be clearly seen here that the main tool body 2 comprises an inner hub portion, a wheel-shaped portion 6 and four spoke portions 7. The extension arms 8 are screwed on to the spoke portions 7. The cutting insert holder 9 which in turn comprises a slider body 15 and a holding element 16 which is accommodated therein and which includes the cutting insert seat has at least one slot, in the illustrated embodiment three slots 17 can be seen. The extension arm 8 has a corresponding number of screwthreaded bores 18 so that the cutting insert holder 9 can be radially adjusted by virtue of the slots 17. As already mentioned that is effected by means of the adjusting screw 14 (see FIG. 2).

The above-mentioned cutting element is of a multi-part configuration in the illustrated embodiment and comprises the extension arm 8, the slider body 15 and the holding element 16 arranged thereon.

It will be appreciated that it is also possible to dispense with the extension arm and the slider body 15 can be fastened directly to the main tool body 2.

It can be clearly seen from the view in FIG. 4 that the extension arm 8 has a second set of screwthreaded bores 18. The cutting insert holder 9 can therefore be completely released from the extension arm 8 and re-fastened by means of the additional screwthreaded bores at a position spaced radially therefrom. In the new position the slots 17 also allow a certain radial displacement of the cutting insert holder relative to the extension arms 8.

To enlarge the range of boring diameters however not only can the cutting insert holder be displaced relative to the extension arm but it is also possible to use an extension arm 8 of a different configuration or a main tool body 2 of a different configuration. It is also possible to use the tool main body with a different number of spoke portions. In addition it is not absolutely necessary for the individual spoke portions to be arranged equidistantly in the peripheral direction. On the contrary, in the case of a so-called differential pitch indexing, it has been found that vibrations which could occur in operation can be minimised.

Figure 5:
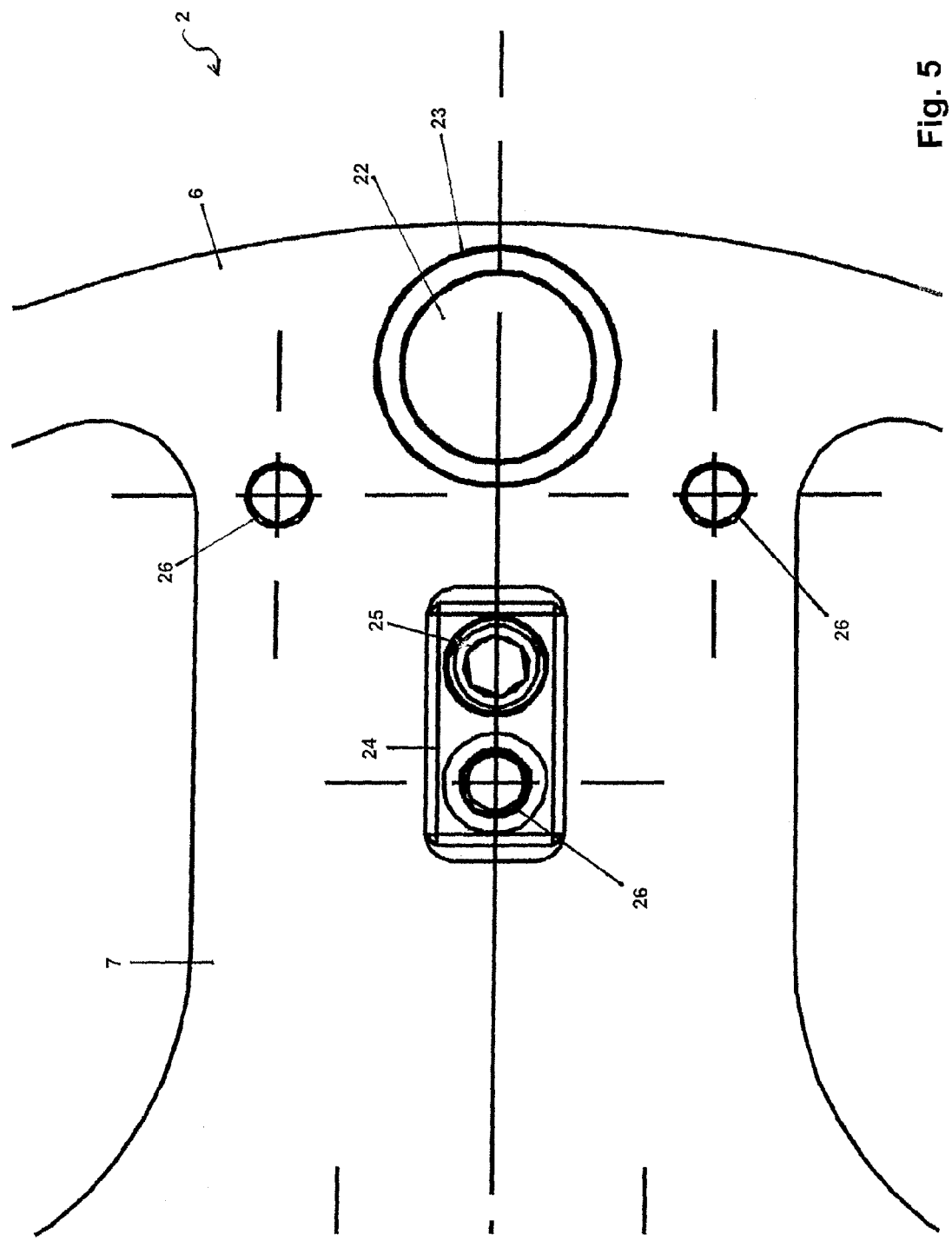
FIG. 5 shows a detail view on an enlarged scale from above on to a main tool body.

Fastening of the extension arm 8 to the main tool body 2 is described hereinafter with reference to FIGS. 5 through 8. FIG. 5 shows a detail view on an enlarged scale of the main tool body 2. The main tool body 2 illustrated here corresponds to the embodiment shown in FIGS. 1 through 4. That kind of fastening can in principle be used not only in relation to the embodiments illustrated here but generally for fastening two tool parts together.

The main tool body 2 has a circular recess 22 (blind bore) into which a centering sleeve 23 is fitted. There is also provided a slot nut 24 which is fastened on the main tool body 2 by means of a slot nut fastening screw 25. The slot nut 24 has two through bores, of which one serves for fastening the slot nut 24 to the main tool body 2 by means of the slot nut fastening screw 25. The other bore extends coaxially relative to one of the three fastening bores 26. The fastening bores 26 serve for fastening the extension arm 8 to the main tool body 2.

It will be seen that the two through bores in the slot nut 24 and the blind bore 22 are spaced from each other only in the radial direction but not in the peripheral direction. The corresponding bores are therefore all disposed on a line which is diagrammatically illustrated.

Figure 6:
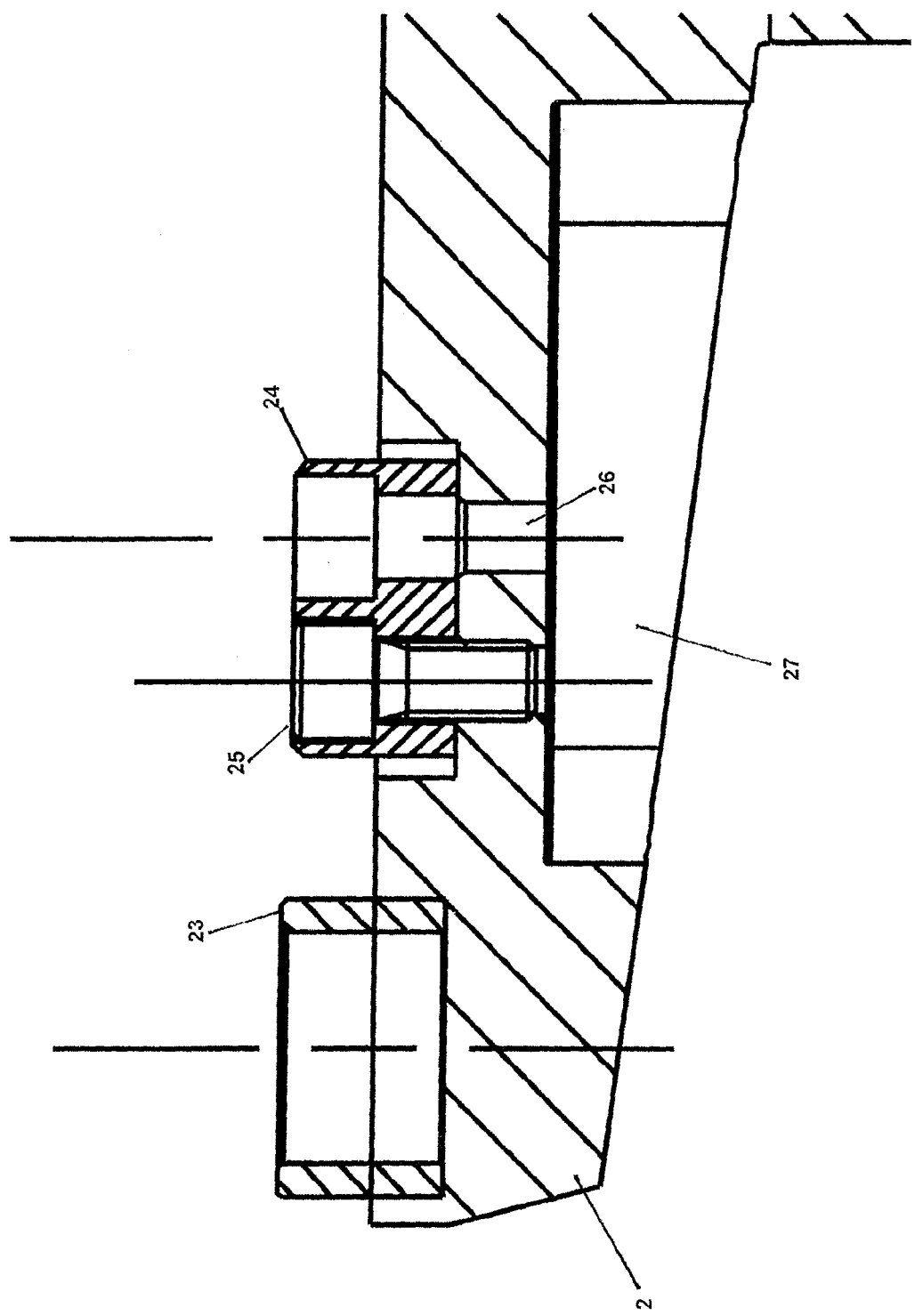
FIG. 6 shows a sectional view on an enlarged scale of the main tool body of FIG. 5.

FIG. 6 shows a sectional view through the embodiment of FIG. 5. Shown here is the main tool body 2 which has a chamber 27 at its underside. It is also possible to see the centering sleeve 23 arranged in the blind bore 22. The axial length of the centering sleeve 23 is greater than the depth of the blind bore 22 so that the centering sleeve 23 projects in the axial direction beyond the main tool body 2. It will further be seen that the slot nut 24 is accommodated in a corresponding slot in the main tool body 2. For fastening the slot nut 24 in the slot a fastening screw 25 extends through a corresponding stepped bore in the slot nut 24 into a screwthreaded bore in the main tool body 2. The slot nut has a second bore arranged coaxially with respect to a further screwthreaded bore 26 in the main tool body 2.

Figure 7:
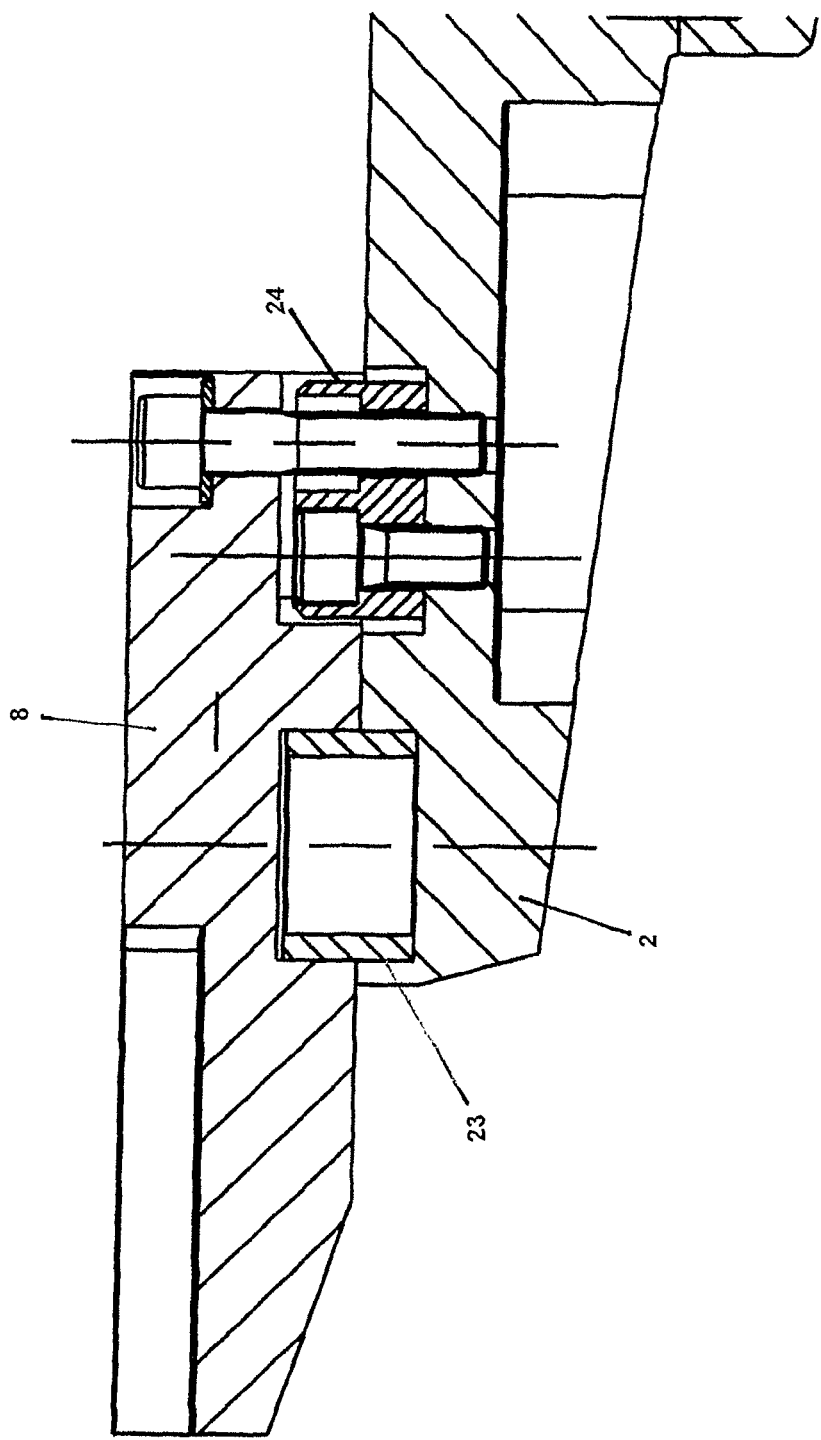
FIG. 7 shows a sectional view on an enlarged scale of the main tool body of FIG. 6 with attached extension arm.

FIG. 7 shows the same sectional view as FIG. 6, but in FIG. 7 an extension arm 8 which is part of the holding element to be fastened to the main tool body is fastened on the main tool body 2. It will be seen that at its underside the extension arm 8 has a similarly circular recess like the main tool body 2 so that the centering sleeve 23 extends from the blind bore 22 in the main tool body 2 into the circular recess in the extension arm 8. The centering sleeve 23 provides for accurate positioning of the extension arm 8 in relation to the main tool body 2. The slot nut 24 is provided to prevent rotation of the extension arm 8 relative to the main tool body 2. At its underside the extension arm 8 has a corresponding slot into which the slot nut 24 can engage. Three fastening screws with which the extension arm 8 is screwed fast to the main tool body 2 serve for fastening the extension arm 8 to the main tool body 2. As can be seen from FIG. 7 one of those screws engages through a corresponding bore in the slot nut 24 into the main tool body 2.

Figure 8:
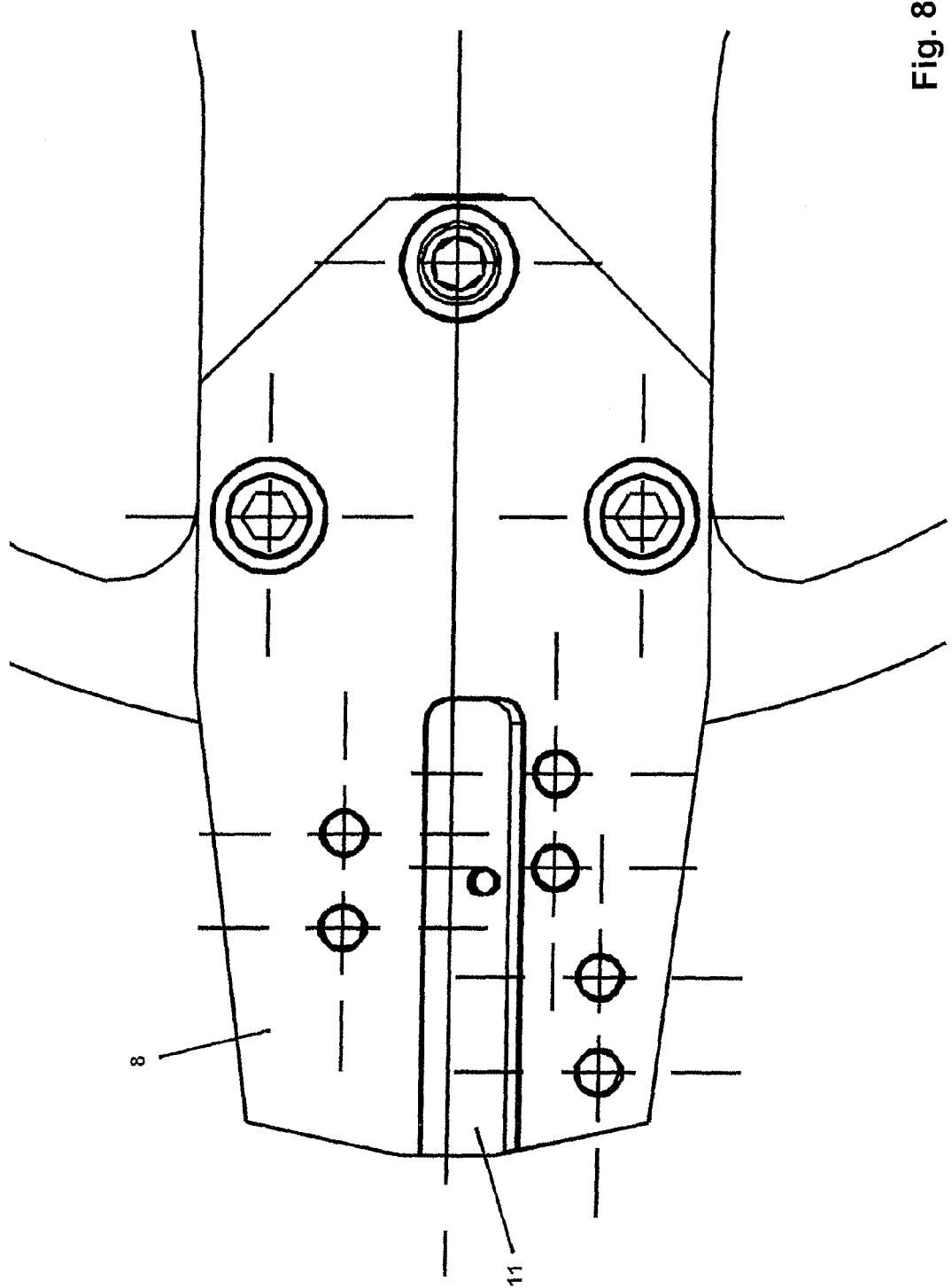
FIG. 8 shows a detail view on an enlarged scale of the main tool body of FIG. 5 with attached extension arm.

FIG. 8 shows a plan view of the main tool body 8, similarly to FIG. 5, but here the extension arm 8 is fastened to the main tool body 2.

It will be appreciated that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. That also applies to any combinations of features within any one of the appendant claims. A comprehensive explicit representation of all conceivable combinations of features is dispensed with here only for the sake of brevity and readability of the description.

LIST OF REFERENCES

1 boring tool
2 main tool body
3 interface
4 gripping groove
5 flange
6 wheel-shaped portion
7 spoke portions
8 extension arm
9 cutting insert holder
10 leg-like projection
11 slot
12 cutting insert
13 clamp
14 screw
15 slider body
16 holding element
17 slot
18 screwthreaded bore
22 blind bore
23 centering sleeve
24 slot nut
25 slot nut fastening screw
26 fastening bores
27 chamber

The invention claimed is:

1. A milling or boring tool comprising:
a main tool body rotatable about a tool axis; and
a cutting element which can be fastened to the main tool body and which has a cutting portion or a cutting insert seat for receiving a cutting insert,
wherein a centering pin, which is arranged parallel to the boring axis and the axis of which does not coincide with the tool axis, is connected on one part, the main tool body or the cutting element, and a corresponding centering opening is provided on the other part, the cutting element or the main tool body, and
wherein there is provided a slot nut on the main tool body or the cutting element and there is provided a corresponding first slot on the other element, wherein the slot nut at least partially engages into the first slot.

2. A milling or boring tool as set forth in claim 1 wherein the centering pin is releasable from the one part.

3. A milling or boring tool as set forth in claim 1 wherein the centering pin is in the form of a centering sleeve.

4. A milling or boring tool as set forth in claim 1 wherein the slot nut is releasable from the one element.

5. A milling or boring tool as set forth in claim 4 wherein the slot nut has two fastening bores, wherein the first fastening bore for fastening the slot nut is provided on the one element and the second fastening bore for fastening the other element is provided on the slot nut or the one element.

6. A milling or boring tool as set forth claim 1 wherein the first slot is on a secant through the centering opening.

7. A milling or boring tool as set forth in claim 1 wherein the centering pin is arranged further away from the tool axis than the slot nut.

8. A milling or boring tool as set forth in claim 1 wherein there are provided at least two cutting elements.

9. A milling or boring tool as set forth in claim 3 wherein the centering pin has a diameter d of more than 2 cm.

10. A milling or boring tool as set forth in claim 9 wherein the centering pin has a diameter d of more than 5 cm.

11. A milling or boring tool as set forth in claim 4 wherein the one element has a second slot in which the slot nut is partially received and fastened.

12. A milling or boring tool as set forth in claim 11 wherein the slot nut has two fastening bores, wherein the first fastening bore for fastening the slot nut is provided on the one element and the second fastening bore for fastening the other element is provided on the slot nut or the one element.

13. A milling or boring tool as set forth claim 6 wherein the secant extends through the center point of the centering opening.

\* \* \* \* \*